(12) United States Patent
Peng

(10) Patent No.: US 8,383,074 B2
(45) Date of Patent: Feb. 26, 2013

(54) PROCESS AND DEVICE FOR SIMULTANEOUSLY DESULFURIZING AND DENITRATING THE FLUE GAS WITH THE SEAWATER

(75) Inventor: Sigan Peng, Wuhan (CN)

(73) Assignee: Sigan Peng, Wuhan, Hubei (CN)

( * ) Notice: Subject to any disclaimer, the term of this patent is extended or adjusted under 35 U.S.C. 154(b) by 22 days.

(21) Appl. No.: 13/124,566

(22) PCT Filed: Oct. 17, 2008

(86) PCT No.: PCT/CN2008/072729
§ 371 (c)(1),
(2), (4) Date: Jul. 27, 2011

(87) PCT Pub. No.: WO2010/043083
PCT Pub. Date: Apr. 22, 2010

(65) Prior Publication Data
US 2011/0274605 A1 Nov. 10, 2011

(51) Int. Cl.
*B01D 53/50* (2006.01)
*B01D 53/56* (2006.01)
*B01D 53/74* (2006.01)

(52) U.S. Cl. ............... 423/235; 423/243.01; 423/243.07; 422/168

(58) Field of Classification Search .................. 423/235, 423/243.01, 243.07; 422/168
See application file for complete search history.

(56) References Cited

U.S. PATENT DOCUMENTS

| | | | | |
|---|---|---|---|---|
| 5,225,176 A | * | 7/1993 | Greefkes | 423/243.01 |
| 5,690,899 A | * | 11/1997 | Makkinejad et al. | 423/243.01 |
| 6,759,019 B1 | * | 7/2004 | Shiraishi et al. | 423/210 |
| 2010/0266472 A1 | * | 10/2010 | Peng | 423/243.01 |

* cited by examiner

*Primary Examiner* — Timothy Vanoy
(74) *Attorney, Agent, or Firm* — Seed IP Law Group PLLC

(57) ABSTRACT

A process for simultaneously desulfurizing and denitrating the flue gas with seawater includes the following steps: 1) catalytically scrubbing the flue gas containing $SO_2$ and NOx with the seawater to obtain purified flue gas and acidic seawater, optionally adding a certain quantity of iron ions into the seawater or applying magnetic field during scrubbing; 2) adding seawater into the acidic seawater while blowing air in so as to restore the quality of the acidic seawater up to the environmental standards. Also a device used in the process is provided.

16 Claims, 3 Drawing Sheets

PROCESS AND DEVICE FOR SIMULTANEOUSLY DESULFURIZING AND DENITRATING THE FLUE GAS WITH THE SEAWATER

TECHNICAL FIELD

The invention relates to a process and a device for simultaneously desulfurizing and denitrating flue gas with seawater, i.e. simultaneously removing SOx and NOx from flue gas with seawater, particularly suitable for reducing emission of pollutants such as sulfur dioxide and nitrogen oxides from, for example, boilers in a thermal power plant, which belongs to the technical field of atmospheric environmental protection, and more particularly, belongs to the technical field of simultaneous desulfurization and denitrification of flue gas.

BACKGROUND ART

Emission of two major types of pollutants, namely sulfur dioxide and nitrogen oxides, from industrial flue gas must be reduced in order to protect atmospheric environment. However, conventional processes for reducing emissions using a desulfurizing process unit and a denitrating process unit separately have problems such as low reliability and high constructional and operational costs, etc., due to their complex process structures and enormous resource consumption. Thus, conventional processes for removing SOx and NOx separately are severely restricted in terms of pollution alleviation and environmental protection. To prevent and control pollution caused by SOx and NOx and thus protect the atmospheric environment effectively, there has long been a need for an integrated, environmentally friendly technology for reducing emissions, and expectation of an environmentally friendly technical solution of simultaneous desulfurization and denitrification of flue gas.

Internationally, the typical schemes in technical field of simultaneous desulfurization and denitrification of flue gas are mainly as following:

DESONOX process, developed by Degussa Company, Germany, etc. (see FIG. 6), wherein ammonia solution ($NH_3$) is sprayed into flue gas firstly, and then the flue gas enters a fixed bed reactor with double-layer catalysts, the first of which is a selective catalytic reduction (SCR) catalyst made of noble metals such as vanadium, etc., to catalyze the reduction of NOx by $NH_3$ to $N_2$ and $H_2O$, and the second of which is an oxidative desulfurization catalyst of noble metals to catalyze the oxidation of $SO_2$ to $SO_3$ which is absorbed by water and then condensed to form sulfuric acid;

PHOSNOX process, developed by University of California, USA, wherein NO is oxidized to $NO_2$ by $O_3$ and O produced by yellow phosphorus, while yellow phosphorus is oxidized to $P_2O_5$ which forms phosphoric acid, and the $NO_2$ oxidizes $SO_2$ in an aqueous solution to $SO_4^{2-}$ and itself is reduced to hydroxylamine disulphonate, ammonium salt and other S—N compounds;

PPCP process, developed by Fukui University of Technology, Japan, wherein high-energy electron beams generated by an accelerator are used to dissociate gaseous molecules in flue gas into O, OH, $HO_2$ and other active groups which oxidize $SO_2$ and NOx to form ammonium sulfate and ammonium nitrate after ammonia is added; and so on.

Domestically in China, patented or patent pending technical solutions of simultaneous desulfurization and denitrification of flue gas include: application No. 200610012525.2 developed by North China Electric Power University and entitled "Liquid Phase Flue Gas Desulfurizing and Denitrifying Purification Method and Apparatus", wherein an absorption solution of sodium chlorite with a combined additive, including calcium hypochlorite, hydrogen peroxide solution, disodium hydrogen phosphate, etc., is used to absorb sulfur dioxide and nitrogen oxides from flue gas in an ejection bubbling process; and patent No. 01105698.3 developed by East China University of Science and Technology and entitled "Process For Removing NOx from Waste Gas", i.e., a complexation-catalysis process with cobalt (II) bis(ethylenediamine), wherein a catalyst including metal oxides such as NiO, $CO_3O_4$ loaded on $Al_2O_3$ is used to oxidize NO to $NO_2$ in an alkaline solution; and so on.

The existing technical solutions of simultaneous desulfurization and denitrification confront the common problems. To achieve simultaneous desulfurization and denitrification, noble catalysts and/or absorbents need to be added in the process. The use of chemical materials of absorbents and catalysts, particularly the noble catalysts, results in excessive consumption of resources and energy, complication of process, low reliability of the whole processing device, high constructional and operational costs, and secondary pollution in some instances. Thus, it is difficult to apply these schemes widely.

SUMMARY OF THE INVENTION

The object of the present invention is to overcome the disadvantages of the prior arts essentially and to provide an integrated, environmentally friendly technical solution for reducing emissions of pollutant without further adding noble or secondary-pollution-producing absorbents or/and catalysts, which may save resources and energy, use a simple and reliable process, bear low cost and lead to no secondary pollution. Specifically, the technical solution involves a process and a device for simultaneously desulfurizing and denitrating flue gas with seawater as the main absorbent and catalyst.

The technical solution of simultaneous desulfurization and denitrification of flue gas with seawater to achieve the object of the present invention is as follows:

A simultaneously desulfurizing and denitrating process for flue gas with seawater includes below steps: A) catalytically scrubbing the flue gas with the seawater, wherein the flue gas containing $SO_2$ and NOx is catalytically scrubbed with the seawater to remove $SO_2$ and NOx from the flue gas, and then the purified flue gas after being desulfurized and denitrated and the acidic seawater formed during scrubbing are discharged; wherein the catalytic scrubbing refers to iron catalytic scrubbing carried out with the seawater having a certain quantity of iron ions or with the seawater to which a certain quantity of iron ions is added, and/or magnetic catalytic scrubbing carried out by having the seawater and/or the flue gas pass through an applied magnetic field; B) restoring the quality of the acidic seawater, wherein the acidic seawater discharged in the step A) is mixed with seawater for acid-alkali neutralization and air is blown in, so as to discharge after the quality of the acidic seawater is restored to meet environmental protection requirements.

In the simultaneously desulfurizing and denitrating process, the iron catalytic scrubbing with seawater having a certain quantity of iron ions is carried out in the scrubbing step with the seawater having an iron ion concentration of 3 to 300 micrograms per kilogram (3-300 μg/kg).

In the simultaneously desulfurizing and denitrating process, the iron catalytic scrubbing with seawater having a certain quantity of iron ions is carried out in the scrubbing step with the seawater having an iron ion concentration of 10 to 300 micrograms per kilogram (10-300 μg/kg).

In the simultaneously desulfurizing and denitrating process, the flow of the seawater for scrubbing the flue gas depends on the alkali-acid ratio of the seawater for scrubbing to the flue gas: the alkali volume of the seawater for scrubbing the flue gas/the acid volume of the flue gas to be scrubbed ranges from 1 to 200, wherein the alkali volume of the seawater for scrubbing the flue gas is the product of the alkalinity of the seawater multiplied by the flow of the seawater, the alkalinity of the seawater equals to the total alkalinity (ALK) of the seawater measured in millimole per liter (mmol/l), and the flow of the seawater equals to the value of the seawater measured in milliliter per hour (ml/h); and the acid volume of the flue gas to be scrubbed is the product of the sulfur concentration of the flue gas multiplied by the flow of the flue gas, the sulfur concentration equals to the $SO_2$ concentration of the flue gas measured in milligram per normal cubic meter (mg/Nm$^3$), and the flow of the flue gas equals to the value of the flue gas measured in normal cubic meter per hour (Nm$^3$/h).

In the simultaneously desulfurizing and denitrating process, the iron catalytic scrubbing with seawater to which a certain quantity of iron ions is added is the iron catalytic scrubbing with an adding process of disposing an iron member in the acidic seawater and/or making iron material in contact with the seawater into a sacrificial anode and/or making use of a device capable of adding a ferrous solution to add iron ions.

In the simultaneously desulfurizing and denitrating process, the magnetic catalytic scrubbing is carried out by having the seawater and/or the flue gas pass through the magnetic field with a magnetic flux density ranging from 1 to 6000 gauss.

The technical solution of a simultaneously desulfurizing and denitrating device for a process for simultaneously desulfurizing and denitrating the flue gas with seawater is described as follows: the device includes a system for catalytically scrubbing with the seawater and a system for restoring the quality of the acidic seawater, wherein the system for catalytically scrubbing with seawater includes a scrubber, a flue gas inlet of the scrubber, a flue gas outlet of the scrubber, a seawater inlet of the seawater for scrubbing flue gas, an acidic seawater outlet of the scrubber, an iron member or an iron-ion-adding device for increasing the content of iron ions in the seawater, and/or a magnetic device for applying magnetic field on the seawater for scrubbing the flue gas and/or on the flue gas; the system for restoring the quality of the acidic seawater includes a water-quality restorer, communicating with an acidic seawater channel, a seawater channel, an air blower and a seawater outlet; an acidic seawater inflow inlet and a seawater inflow inlet are close to each other in the water-quality restorer; the air blower communicates with an aerating nozzle which is disposed in the water-quality restorer through an air blowing channel.

In the simultaneously desulfurizing and denitrating device, the iron member is an iron filler and/or a fixed or replaceable iron element disposed in the scrubber in direct contact with the acidic seawater.

In the simultaneously desulfurizing and denitrating device, the iron-ion-adding device is an injector communicating with a ferrous solution inflow inlet and/or an iron ion generating unit disposed on the scrubber.

In the simultaneously desulfurizing and denitrating device, the magnetic device is a magnetic filler and/or a magnetic member disposed in the scrubber, and/or a magnetic member disposed in the scrubbing seawater and/or the flue gas channels.

The technological principle of the process according to the invention is described as follows.

Catalytically Scrubbing with Seawater:

When flue gas is scrubbed with seawater, $SO_2$ in the flue gas is dissolved in the seawater to form acidic seawater, and the formulae of the reaction are as follows:

$$SO_2 (g) + H_2O \rightleftharpoons SO_2 (l) + H_2O$$

$$SO_2 (l) + H_2O \rightleftharpoons SO_3^{2-} + 2H^+$$

2. When the flue gas is scrubbed further with the acidic seawater, NO is dissolved. In contrast to a wet process generally incapable of realizing denitrification due to insolubility of NO in water, the technical solution of the invention has physicochemical conditions for catalyzing and facilitating the dissolution (hydrolyzation) of NO, which include the following: a) A large amount of $SO_3^{2-}$ which is produced in the acidic seawater formed in the first step of dissolving sulfur dioxide can facilitate the dissolution of NO; b) Under the acidic condition formed in the first step of dissolving sulfur dioxide, iron ions ($Fe^{2+}$, $Fe^{3+}$) both originally existing in the seawater and increased in the process of the invention have catalytic effect; c) Under the acidic condition formed in the first step of dissolving sulfur dioxide, iron ions ($Fe^{2+}$, $Fe^{3+}$) form complicated iron complexes in the seawater which can facilitate reactions of the dissolved $SO_2$ and the entrapped $O_2$ in the flue gas to produce compounds such as $N_2$, $N_2O$, dithionates, sulfates, etc., and for example, according to the following formula: $2(NO) + SO_3^{2-} \rightarrow N_2O + SO_4^{2-}$, etc., the flue gas from a boiler in a power plant generally has about 5-8% residual oxygen; d) Under the acidic condition formed in the first step of dissolving sulfur dioxide, the magnetic field applied by the magnetic member catalyzes the dissolution (hydrolyzation) of NO. Reactions of nitrogen oxides in seawater are rather complicated, most of which are synergistically self-catalyzed oxidation-reduction reactions. The purified flue gas is discharged into the atmosphere after being simultaneously desulfurized and denitrated.

Quality Restoring of Acidic Seawater:

After scrubbing the flue gas, the seawater becomes acidic. The quality of the acidic seawater has to be restored to a level compatible with surrounding water before it is released to the natural surroundings, for example, the sea. The water quality may be restored in such a way that seawater, namely alkaline seawater, is added into the acidic seawater and well mixed to allow acid-alkali neutralization, and then air is blown into the seawater to remove acid and increase oxygen by oxidation, which makes sulfurous acid in the seawater converted into sulfites and then oxidized into sulfates which are stable and environmentally friendly to the sea, while carbon dioxide formed in the seawater is expelled and dissolved oxygen in the seawater is increased, as the following chemical equilibrium formulae:

$$CO_3^{2-} + H^+ \rightleftharpoons HCO_3^{2-}$$

$$HCO_3^{2-} + H^+ \rightleftharpoons CO_2 (g+l) + H_2O$$

$$SO_3^{2-} + 1/2 O_2 \rightleftharpoons SO_4^{2-}$$

The pH, COD and dissolved oxygen of the water discharge in the process are restored to be compatible with surrounding water so as to meet environmental protection requirements. A small amount of additional soluble iron in the water discharge in the process is environmentally friendly, not only because iron is not a restricted element according to the quality standards on seawater environment, but also because it is an indispensable element for preventing marine desertification.

The water-quality restoring process of acidic seawater may be carried out in a separate water-quality restoring device, or at the bottom of the catalytic scrubbing device, or in a relevant pipeline or channel.

The process and the device for simultaneously desulfurizing and denitrating flue gas with seawater according to the invention have remarkable technical effects.

Firstly, emissions can be reduced efficiently with removal rates of pollutants in the flue gas up to 99% for $SO_2$ and 70% for NOx.

Secondly, resources and energy can be saved considerably without the need of any chemical material, particularly in a thermal power plant where energy consumption is lower because of reusing the cooling seawater.

Thirdly, they are environmentally friendly. In comparison with other processes for desulfurizing and denitrating flue gas, which consume plenty of chemical materials and produce a large amount of waste solid, the process of the invention produces no waste solid, and every part of the discharge of seawater relevant to the process of the invention meets environmental protection requirements.

Figure 1:
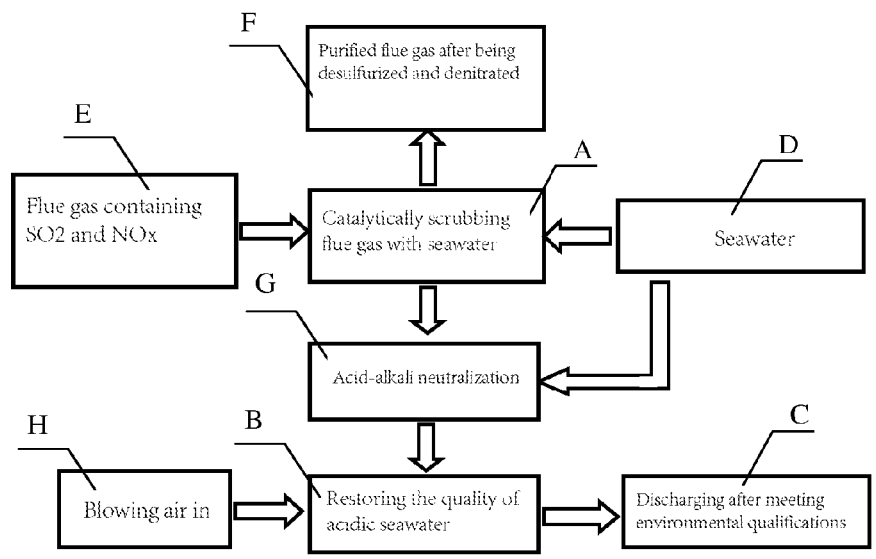
FIG. 1 shows the schematic flow chart of the process for simultaneously desulfurizing and denitrating flue gas with seawater according to the present invention.

The reference numbers in the drawings stand for the following components or structures:

In FIG. 1: A—Catalytically scrubbing flue gas with seawater; B—Restoring the quality of acidic seawater; C-Discharging after meeting environmental protection requirements; D-Seawater; E-Flue gas containing $SO_2$ and NOx; F-Purified flue gas after being desulfurized and denitrated; G-Acidalkali neutralization; H-Blowing air in.

In FIG. 2-5: 1-scrubber; 1.1-filler; 1.2-support; 1.3-seawater dispenser; 1.4-defogger; 1.5-iron member; 1.5'-magnetic member; 1.6-ferrous solution inflow inlet; 1.7-flow regulator; 1.8-ferrous solution pump; 1.9-door opening for replacing iron member; 2-flue gas inlet of the scrubber; 3-flue gas outlet of the scrubber; 4-seawater inlet of the scrubber; 5-acidic seawater outlet of the scrubber; 6-water-quality restorer; 7-acidic seawater inflow inlet; 8-seawater inflow inlet; 8-1-inflow inlet for early-mixing seawater; 8-2-inflow inlet for late-mixing seawater; 9-acidic seawater channel; 10-seawater channel; 11-air blower; 12-air blowing channel; 13-aerating nozzle in the water-quality restorer; 13x- aerating nozzle array; 14-seawater outlet; 15-boiler; 16dust catcher; 17-suction fan; 18-chimney; 19-seawater pump; 20-condenser in the power plant; 21-flue gas reheater.

Figure 4:
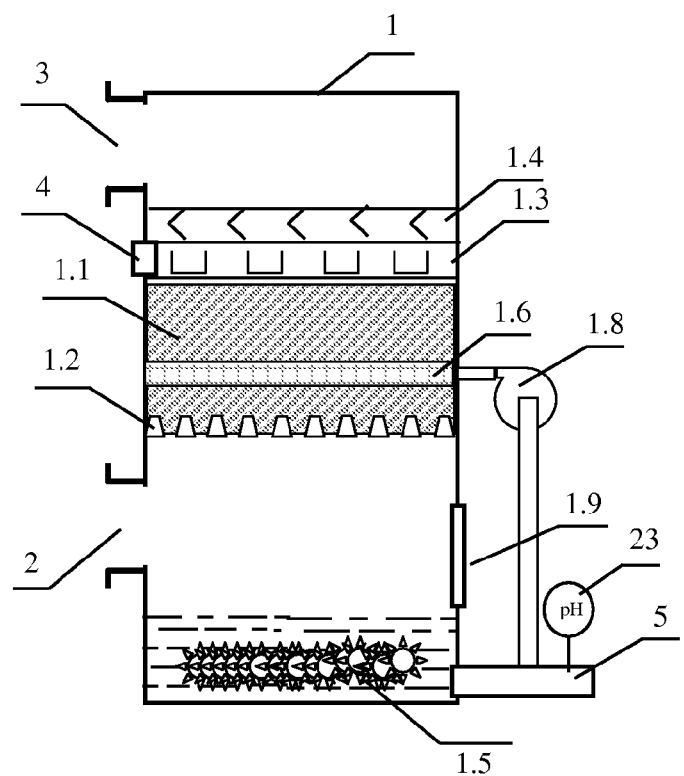
FIG. 4 shows the schematic view of another embodiment of the structure of the scrubber 1 in the device according to the invention, wherein an iron ion generating unit is disposed, which is composed of a seawater pool at the bottom of the scrubber 1 for immersing the replaceable or addible iron member 1.5 in the acidic seawater, and a replaceable or addible iron pipeline for transporting the acidic seawater.

In FIG. 4: 22-flowmeter; 23-pH meter

Figure 6:
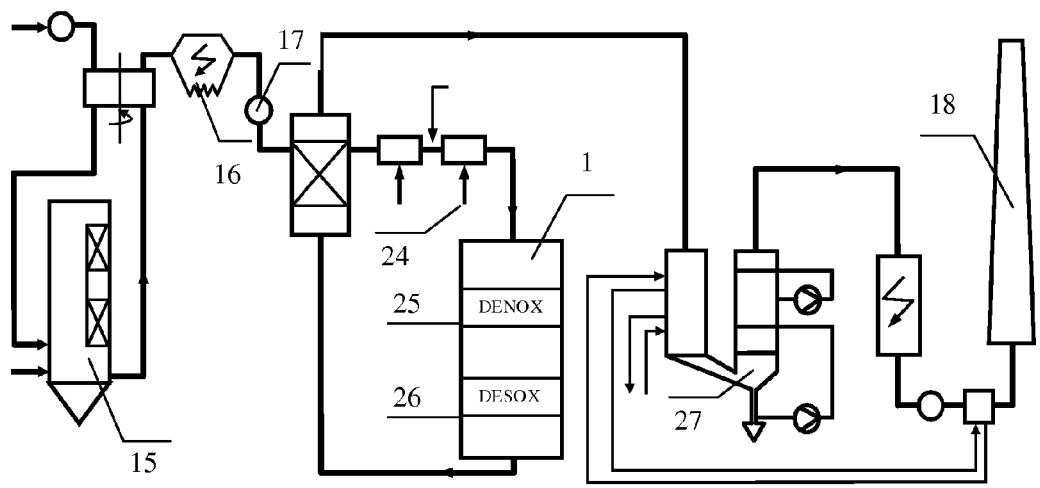
FIG. 6 shows the schematic view of the DESONOX process for simultaneous desulfurization and denitrification, as one of the prior art technical solutions for simultaneously desulfurizing and denitrating flue gas, for use in a thermal power plant, wherein the DESONOX process is developed by Degussa Company, Germany, etc.

In FIG. 6: 24-channel for adding ammonia; 25-noble metal catalyst for reductive denitrification; 26-noble metal catalyst for oxidative desulfurization; 27-sulfuric acid absorber.

DETAILED DESCRIPTION OF THE INVENTION

Detailed description of the process for simultaneously desulfurizing and denitrating flue gas with seawater according to the invention will be demonstrated in more details with reference to the drawings and the following embodiments.

Embodiment 1

Figure 2:
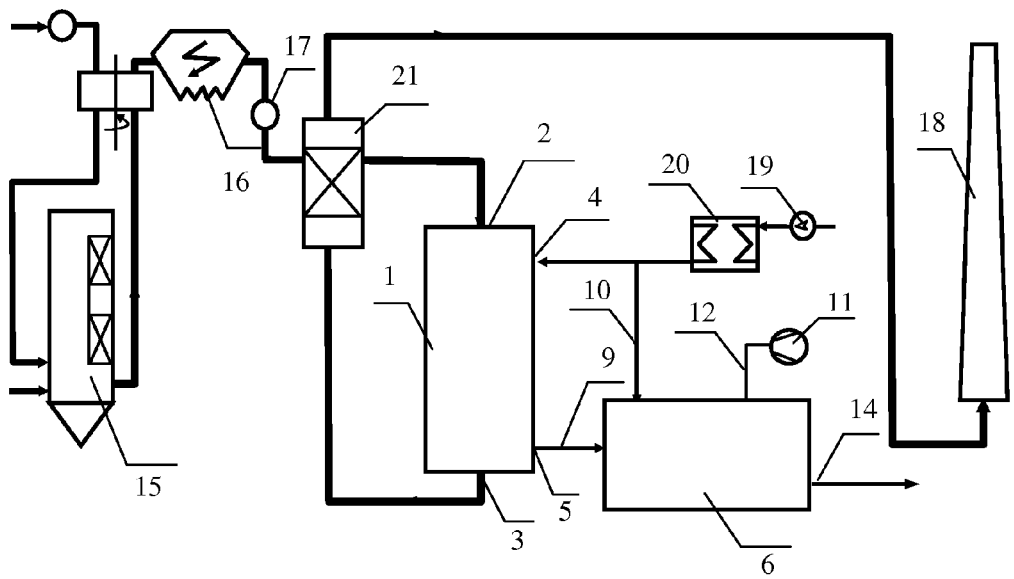
FIG. 2 shows the schematic view of a device according to the invention used in a thermal power plant.

FIG. 1 shows the schematic flow chart of the process for simultaneously desulfurizing and denitrating flue gas with seawater according to the invention. FIG. 2 shows the processing procedure of the invention used in a thermal power plant. The process for simultaneously desulfurizing and denitrating flue gas with seawater according to this embodiment includes the following steps: A) catalytically scrubbing the flue gas with the seawater, wherein the flue gas containing $SO_2$ and NOx is catalytically scrubbed with seawater to remove $SO_2$ and NOx, and the purified flue gas after being desulfurized and denitrated and the acidic seawater formed during scrubbing are discharged; the catalytic scrubbing in the invention refers to iron catalytic scrubbing carried out with seawater having a certain quantity of iron ions or seawater to which a certain quantity of iron ions is added, and/or magnetic catalytic scrubbing by having the seawater and/or the flue gas pass through an applied magnetic field; the catalytic scrubbing in this embodiment refers to iron catalytic scrubbing carried out with seawater to which a certain quantity of iron ions is added, by, specifically in this embodiment, disposing an iron member in the acidic seawater; B) restoring the quality of the acidic seawater, wherein the acidic seawater discharged in the step A) is mixed and neutralized with seawater and air is blown in to restore the quality of the acidic seawater to meet environmental protection requirements before it is discharged.

The iron catalytic scrubbing is carried out in the scrubbing step with seawater having an iron ion concentration of 3 to 300 micrograms per kilogram (3-300 µg/kg), particularly, 32 µg/kg in this embodiment. The flow of the seawater for scrubbing the flue gas depends on the alkali-acid ratio of the seawater for scrubbing to the flue gas: the alkali volume of the seawater for scrubbing the flue gas/the acid volume of the flue gas to be scrubbed ranges from 1 to 200, wherein the alkali volume of the seawater for scrubbing the flue gas is the product of the alkalinity of the seawater multiplied by the flow of the seawater, the alkalinity of the seawater equals to the total alkalinity of the seawater measured in millimole per liter (mmol/l), and the flow of the seawater equals to the value of the seawater measured in milliliter per hour (ml/h); the acid volume of the flue gas to be scrubbed is the product of the sulfur concentration of the flue gas multiplied by the flow of the flue gas, the sulfur concentration equals to the $SO_2$ concentration of the flue gas measured in milligram per normal cubic meter ($mg/Nm^3$), and the flow of the flue gas equals to the value of the flue gas measured in normal cubic meter per hour ($Nm^3/h$). Particularly, the acid-alkali ratio of the scrubbing seawater to the flue gas in this embodiment is 6.5.

It shall be further explained that the seawater for scrubbing flue gas comes from the sea. In other words, the seawater in use may come from the sea directly or indirectly. In the latter case, seawater discharged from an industrial facility is reused. The desired flow of seawater has two meanings. One refers to the total flow of seawater, and the other is directed to the flow of the seawater for catalytically scrubbing flue gas. The lower limit of the total flow of seawater is the desired flow for fulfilling acid-alkali neutralization which is determined according to the equivalent of the acidic gas to be removed from the flue gas and the alkalinity equivalent of the seawater. For application in most seaside thermal power plants, the total flow of desired seawater in the process of the invention is not more than the flow of the cooling seawater in the plants, and all of the cooling seawater from the condensers and/or the cooling pumps in the plants can be reused directly, leading to considerable saving in energy consumption for operation. Part of the total flow of seawater is used as scrubbing seawater in the step of catalytically scrubbing of flue gas, and the remaining part is used as mixing seawater in the water-quality restoring step.

The above-mentioned iron catalytic scrubbing with seawater carried out by disposing an iron member in the acidic seawater is a process of catalyzing the oxidation-reduction reactions of nitrogen oxides using soluble iron and/or iron salts produced in the scrubbing seawater. Specifically, an iron filler is disposed in the acidic scrubbing environment to intensify the removal of NOx. In the step of restoring the quality of the acidic seawater, seawater is mixed into the acidic seawater and then air is blown in. Any conventional aerating methods may be used to blow air into the seawater. According to a chemical engineering manual, the flow of the seawater into which air is blown equals the total flow of seawater as described above. As used herein, seawater for being mixed into the acidic seawater refers to the seawater which has not been used to scrub and absorb acidic gas and thus remains alkaline, constituting a part of the total flow of seawater. The seawater-quality restoring step is preferably completed in an individual device for restoring the quality of the seawater, and it may also be completed at the bottom of the catalytic scrubbing device or in a relevant pipeline or channel. In the water discharge step, the resultant seawater treated by mixing and aerating is discharged into the sea. Alternatively, when the discharged water needs further treatment for comprehensive use, for example, for extraction of sodium chloride or magnesium chloride, the resultant seawater treated by mixing and aerating may be delivered to a subsequent process, which constitutes another technical solution. The ratio of the alkali volume of the seawater for scrubbing the flue gas to the acid volume of the flue gas to be scrubbed may be regulated by changing the flow of the seawater for scrubbing flue gas.

The main parameters of this embodiment include:
Flow of flue gas: 3,100,000 $Nm^3/h$ (corresponding to the flow of the flue gas from the boilers of an 1000 MW thermal generator set)
In the original flue gas: $SO_2$ 1600 $mg/Nm^3$, NOx 610 $mg/Nm^3$
Alkali-acid ratio of the seawater for scrubbing to the flue gas: 6.5
Concentration of iron ions in the scrubbing seawater: 32 µg/kg
In the purified flue gas: $SO_2$ 16 $mg/Nm^3$, NOx 320 $mg/Nm^3$
pH of the discharge water from the seawater-quality restoring device: >6.8
COD increment of the discharge water: <1.5 mg/l Embodiment 2

This embodiment is the same as Embodiment 1 except that iron catalytic scrubbing with seawater is carried out by adding iron ions through a device capable of adding a ferrous solution during scrubbing. The main parameters of this embodiment include:
Flow of flue gas: 1,100,000 $Nm^3/h$
In the original flue gas: $SO_2$ 1900 $mg/Nm^3$, NOx 650 $mg/Nm^3$
Alkali-acid ratio of the seawater for scrubbing to the flue gas: 1
Concentration of iron ions in the scrubbing seawater: 106 µm/kg
In the purified flue gas: $SO_2$ 76 $mg/Nm^3$, NOx 380 $mg/Nm^3$
pH of the discharge water from the seawater-quality restoring device: >6.8
COD increment of the discharge water: <0.5 mg/l Embodiment 3

This embodiment is the same as the foregoing embodiments except that the iron catalytic scrubbing is effected by using a metal with a lower electrochemical activity than iron as the cathode and a part of the iron material in the scrubbing environment as the sacrificial anode which releases iron ions. The main parameters of this embodiment include:
Flow of flue gas: 2,100,000 $Nm^3/h$
In the original flue gas: $SO_2$ 1680 $mg/Nm^3$, NOx 580 $mg/Nm^3$
Alkali-acid ratio of the seawater for scrubbing to the flue gas: 200
Concentration of iron ions in the scrubbing seawater: 300 µm/kg
In the purified flue gas: $SO_2$ 80 $mg/Nm^3$, NOx 180 $mg/Nm^3$
pH of the discharge water from the seawater-quality restoring device: >6.8
COD increment of the discharge water: <4.3 mg/l Embodiment 4

This embodiment is the same as Embodiment 1 except that the iron catalytic scrubbing with seawater to which a certain quantity of iron ions is added is effected by both disposing an iron member in the acidic scrubbing environment and using a metal with a lower electrochemical activity than iron as the cathode and a part of the iron material in the scrubbing environment as the sacrificial anode which releases iron ions. In this embodiment, the concentration of iron ions in the seawater for fulfilling the iron catalytic scrubbing with seawater is selected from the range of 10 to 300 micrograms per kilogram (10-300 µg/kg). The parameters different from those of Embodiment 1 include the following:
Alkali-acid ratio of the seawater for scrubbing to the flue gas: 15
Concentration of iron ions in the scrubbing seawater: 10 µm/kg Embodiment 5

This embodiment is the same as the foregoing embodiments except that the catalytic scrubbing is effected by having the seawater and/or the flue gas pass through a magnetic field which is applied by a magnetic material and has a magnetic flux density of 1-6000 gauss. The main parameters of this embodiment include:

Flow of flue gas: 2,900,000 $Nm^3/h$

In the original flue gas: $SO_2$ 2100 $mg/Nm^3$, NOx 670 $mg/Nm^3$

Alkali-acid ratio of the seawater for scrubbing to the flue gas: 7.1

Magnetic flux density of the applied magnetic field: 6000 gauss

In the purified flue gas: $SO_2$ 85 $mg/Nm^3$, NOx 303 $mg/Nm^3$ pH of the discharge water from the seawater-quality restoring device: >6.8

COD increment of the discharge water: <1.6 mg/l

Embodiment 6

This embodiment is the same as Embodiment 5 except that the catalytic scrubbing is effected by both iron catalytic scrubbing with seawater to which a certain quantity of iron ions is added and catalytic scrubbing in a magnetic field applied by a magnetic material. The main parameters of this embodiment include:

Flow of flue gas: 1,900,000 $Nm^3/h$

In the original flue gas: $SO_2$ 1800 $mg/Nm^3$, NOx 720 $mg/Nm^3$

Alkali-acid ratio of the seawater for scrubbing to the flue gas: 16

Concentration of iron ions in the scrubbing seawater: 3 μg/kg

Magnetic flux density of the applied magnetic field: 3000 gauss

In the purified flue gas: $SO_2$ 85 $mg/Nm^3$, NOx 203 $mg/Nm^3$ pH of the discharge water from the seawater-quality restoring device: >6.8

COD increment of the discharge water: <2.8 mg/l

Embodiment 7

This embodiment is the same as Embodiment 6 except for the following parameters:

Alkali-acid ratio of the seawater for scrubbing to the flue gas: 86

Concentration of iron ions in the scrubbing seawater: 210 μg/kg

Magnetic flux density of the applied magnetic field: 1 gauss

B. The technical solution of the device specially used in the process for simultaneously desulfurizing and denitrating flue gas with seawater of the invention will be further demonstrated with reference to the drawings and the following embodiments.

Embodiment 8

As shown in FIGS. 2 to 5, the technical solutions of the device for simultaneously desulfurizing and denitrating flue gas according to the process of the invention are as follows. The device includes a system for catalytically scrubbing with the seawater, a system for restoring the quality of the acidic seawater and a controlling system. The system for catalytically scrubbing with seawater includes a scrubber 1, a flue gas inlet 2 of the scrubber, a flue gas outlet 3 of the scrubber, a seawater inlet 4 of the seawater for scrubbing flue gas and an acidic seawater outlet 5 of the scrubber. The system for catalytically scrubbing with seawater in the invention further includes an iron member or an iron-ion-adding device for increasing the iron ion content in the seawater, and/or a magnetic device for applying magnetic field on the seawater for scrubbing flue gas and/or on the flue gas. An iron member is used in this embodiment to increase the iron ion content of the seawater. The system for restoring the quality of the acidic seawater includes a water-quality restorer 6, communicating with an acidic seawater channel 9, a seawater channel 10, an air blower 11 and a seawater outlet 14; an acidic seawater inflow inlet 7 and a seawater inflow inlet 8 are close to each other in the water-quality restorer 6; and an aerating nozzle 13 disposed in the water-quality restorer 6 communicates with the air blower 11 through an air blowing channel 12.

It may be further demonstrated as follows.

As shown in FIG. 4, the iron member in this embodiment is an iron filler disposed in the scrubber 1 which can be in direct contact with the acidic seawater, or a fixed or replaceable iron element. Alternatively, both an iron filler and an iron element are disposed in the scrubber 1. The scrubber 1 in the system for catalytically scrubbing with seawater may be designed and manufactured or selected according to a chemical engineering manual. A flow regulator 1.7 of the scrubbing seawater, consisting of an adjustable valve and a speed-regulating pump, is disposed in the scrubber 1. The iron layer of the iron filler is in direct contact with the acidic seawater to increase the iron ion concentration of the acidic seawater. The iron filler may be replaced through the door opening 1.9 for replacing the iron member.

Figure 5:
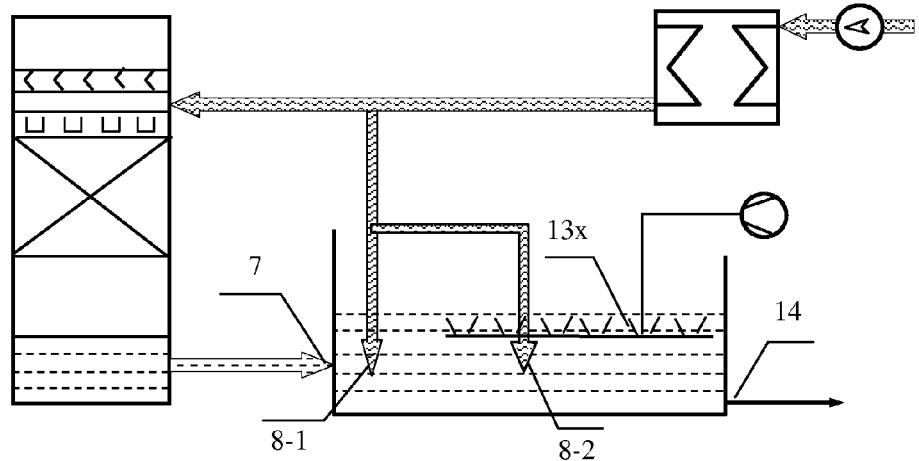
FIG. 5 shows the schematic view of the structure of the water-quality restorer 6 in the device according to the invention, which is a pool capable of mixing and aerating.

As shown in FIG. 5, the system for restoring the quality of the acidic seawater includes a water-quality restorer 6 which consists of a pool, an air blower, an air channel and an aerating nozzle, wherein the pool has a volume that can achieve an aerating time of 1 to 25 minutes, and the air blower can control the ratio of the air flow blown into the seawater in normal cubic meter to the seawater flow into which the air is blown to be in the range of 0.2:1-10:1. The water-quality restorer 6 consists of pool bodies with a mixing function and an aerating function. In the pool body with a mixing function, the acidic seawater and the fresh seawater are mixed, and/or the mixed seawater is stored. The pool body with the mixing function communicates with the airtight pipeline for transporting the acidic seawater, so that the acidic seawater is introduced into the mixing zone and submerged in the alkaline seawater in the seawater-quality restoring device in the condition of being isolated from air. In the mixing zone, the acidic seawater mixes with the alkaline seawater quickly, and the acidic seawater is not allowed to flow up to the water surface during mixing. Alternatively, the pool body with a mixing function consists of pipelines outside the water-quality restorer, so that the acidic seawater and the alkaline seawater may be mixed in the pipeline before being transported to the mixing zone of the seawater-quality restoring device. The pool body with the aerating function may be a shallow aeration pool, in which less energy is consumed and higher efficiency in removing carbon dioxide is achieved, a middle or deep aeration pool may also be used. The aerating nozzle, or aerating head, may be designed and manufactured or selected according to a chemical engineering manual. The seawater-quality restoring device is arranged separately. The seawater inflow inlet 8 comprises two inflow inlets 8-1 and 8-2, wherein the inflow inlet 8-1 for early-mixing seawater is located near the acidic seawater inflow inlet 7, and the inflow inlet 8-2 for late-mixing seawater is located between the aerating nozzle and the seawater outlet 14 along the flowing path of the water. The aerating nozzle 13 is composed of an aerating nozzle array 13x consisting of aerating nozzles which communicate with the air blower through the air channel.

Embodiment 9

This embodiment is the same as Embodiment 8 except that, as shown in FIG. 4, the scrubber 1 comprises an iron ion generating unit, a ferrous solution pump 1.8 and a ferrous solution inflow inlet 1.6, wherein the iron ion generating unit is composed of the acidic seawater in the seawater pool at the bottom of the scrubber 1, an iron member 1.5 submerged in the acidic seawater and iron pipelines for transporting the acidic seawater. The submerged iron member 1.5 and the iron pipelines are replaceable or addible.

Embodiment 10

This embodiment is the same as Embodiment 8 except that, as shown in FIG. 4, an iron-ion-adding device is disposed on the scrubber 1, that is, an injector that communicates with the ferrous solution inflow inlet 1.6 and/or an iron ion generating device is disposed on the scrubber 1.

Embodiment 11

Figure 3:
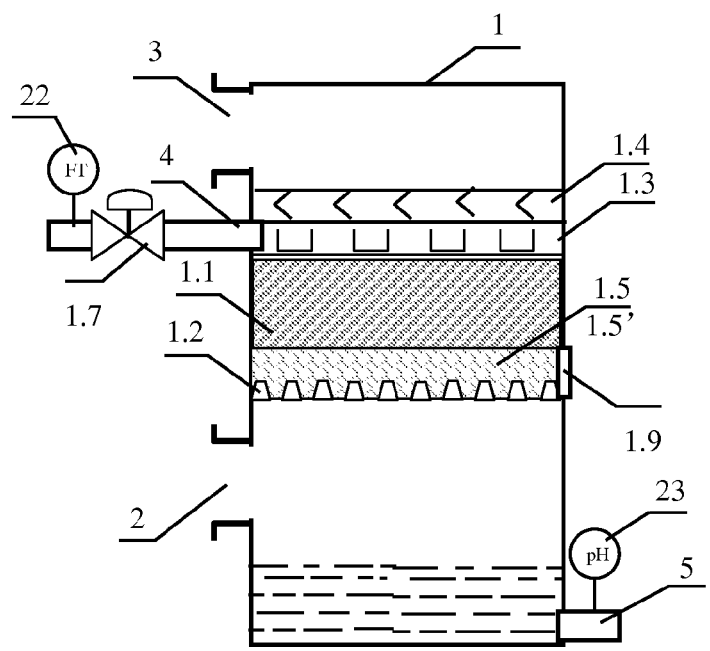
FIG. 3 shows the schematic view of one embodiment of the structure of the scrubber 1 in the device according to the invention, wherein a flow regulator 1.7 and an iron member 1.5 (replaceable with a magnetic member 1.5' when necessary) are disposed.

This embodiment is the same as Embodiment 8 except that, as shown in FIG. 3, the system for catalytically scrubbing with seawater includes a magnetic device for applying magnetic field on the seawater for scrubbing flue gas and/or on the flue gas. The magnetic device is a magnetic filler in the form of a magnetic member 1.5' disposed in the scrubber 1. The material of the magnetic member is ferrites with permanent magnetism, or alloy steel, or a rare earth magnet such as neodymium-iron-boron powder metallurgical material, etc.

Embodiment 12

This embodiment is the same as Embodiment 11 except that the system for catalytically scrubbing with seawater includes both an iron member for increasing the iron ion content in the seawater and a magnetic member for applying magnetic field during scrubbing. In one scheme, an iron member for increasing the iron ion content in the seawater as shown in FIG. 4 is disposed at the lower portion of the scrubber 1 for catalytic scrubbing with seawater, while a magnetic member for applying the magnetic field on the seawater for scrubbing flue gas and/or on the flue gas as shown in FIG. 3 is disposed at the upper portion of the scrubber 1. In another scheme, an iron magnetic member as shown in FIG. 3 is disposed at the upper portion of the scrubber 1, wherein the member is made from iron materials with permanent magnetism and contacts the acidic seawater.

Any one of the components in the scrubber and the water-quality restorer may be designed or selected according to relevant chemical engineering manuals. The scope of the invention is not limited to the foregoing embodiments.

The process and the device for simultaneously desulfurizing and denitrating flue gas according to the present invention exempt the use of chemical raw materials, require small land area, bear low capital cost, and exhibit high efficiency in reducing emissions and high reliability, particularly suitable for medium or large scale thermal power plants to simultaneously desulfurize and denitrate flue gas from boilers.

The invention claimed is:

1. A process for simultaneously desulfurizing and denitrating the flue gas with seawater, characterized in that the process comprises steps:
    A) catalytically scrubbing the flue gas with the seawater, wherein the flue gas containing $SO_2$ and NOx is catalytically scrubbed with the seawater to remove $SO_2$ and NOx from the flue gas, and the purified flue gas after being desulfurized and denitrated and acidic seawater formed during scrubbing are discharged; the catalytic scrubbing refers to iron catalytic scrubbing carried out with the seawater having a certain quantity of iron ions or with the seawater to which a certain quantity of iron ions are added, and/or magnetic catalytic scrubbing carried out by having the seawater and/or the flue gas pass through an applied magnetic field;
    B) restoring quality of the acidic seawater, wherein the acidic seawater discharged in step A) is mixed with seawater for acid-alkali neutralization and air is blown in, so as to discharge after the quality of the acidic seawater is restored to meet environmental protection requirements.

2. The simultaneously desulfurizing and denitrating process of claim 1, characterized in that the iron catalytic scrubbing with the seawater having a certain quantity of iron ions is carried out in the scrubbing step with the seawater having an iron ion concentration of 3 to 300 micrograms per kilogram (3-300 µg/kg).

3. The simultaneously desulfurizing and denitrating process of claim 1, characterized in that the iron catalytic scrubbing with the seawater having a certain quantity of iron ions is carried out in the scrubbing step with the seawater having an iron ion concentration of 10 to 300 micrograms per kilogram (10-300 µg/kg).

4. The simultaneously desulfurizing and denitrating process of claim 1, characterized in that a flow of the seawater for scrubbing the flue gas depends on an alkali-acid ratio of the seawater for scrubbing to the flue gas: alkali volume of the seawater for scrubbing the flue gas/acid volume of the flue gas to be scrubbed ranges from 1 to 200, wherein the alkali volume of the seawater for scrubbing the flue gas is a product of alkalinity of the seawater multiplied by the flow of the seawater, the alkalinity of the seawater equals to the total alkalinity (ALK) of the seawater measured in millimole per liter (mmol/l), and the flow of the seawater equals to the value of the seawater measured in milliliter per hour (ml/h); the acid volume of the flue gas to be scrubbed is the product of sulfur concentration of the flue gas multiplied by the flow of the flue gas, the sulfur concentration equals to $SO_2$ concentration of the flue gas measured in milligram per normal cubic meter ($mg/Nm^3$), and the flow of the flue gas equals to value of the flue gas measured in normal cubic meter per hour ($Nm^3/h$).

5. The simultaneously desulfurizing and denitrating process of claim 1, characterized in that the iron catalytic scrubbing with the seawater to which a certain quantity of iron ions is added is the iron catalytic scrubbing with an adding process of disposing an iron member in the acidic seawater and/or making iron material in contact with the seawater into a sacrificial anode and/or making use of a device capable of adding a ferrous solution to add iron ions.

6. The simultaneously desulfurizing and denitrating process of claim 1, characterized in that the magnetic catalytic scrubbing is carried out by having the seawater and/or the flue gas pass through the magnetic field with a magnetic flux density ranging from 1 to 6000 gauss.

7. A simultaneously desulfurizing and denitrating device for a process for simultaneously desulfurizing and denitrating flue gas with seawater, characterized in that the device comprises a system for catalytically scrubbing with the seawater and a system for restoring the quality of acidic seawater, wherein the system for catalytically scrubbing with the seawater includes a scrubber (1), a flue gas inlet (2) of the scrubber, a flue gas outlet (3) of the scrubber, a seawater inlet (4) of the seawater for scrubbing flue gas, an acidic seawater outlet (5) of the scrubber, an iron member or an iron-ion-adding device for increasing the content of iron ions in the seawater, and/or a magnetic device for applying magnetic field on the seawater for scrubbing the flue gas and/or on the flue gas; the system for restoring the quality of the acidic seawater includes a water-quality restorer (6), communicating with an acidic seawater channel (9), a seawater channel (10), an air blower (11) and a seawater outlet (14); an acidic seawater inflow inlet (7) and a seawater inflow inlet (8) are close to each other in the water-quality restorer (6); the air blower (11) communicates with an aerating nozzle (13) disposed in the water-quality restorer (6) through an air blowing channel (12).

8. The simultaneously desulfurizing and denitrating device of claim 7, characterized in that the iron member is an iron filler and/or a fixed or replaceable iron element disposed in the scrubber (1) in direct contact with the acidic seawater.

9. The simultaneously desulfurizing and denitrating device of claim 7, characterized in that the iron-ion-adding device is an injector communicating with a ferrous solution inflow inlet (1.6) and/or an iron ion generating unit disposed on the scrubber (1).

10. The simultaneously desulfurizing and denitrating device of claim 7, characterized in that the magnetic device is a magnetic filler or/and a magnetic member disposed in the scrubber (1), and/or a magnetic member disposed in the scrubbing seawater and/or flue gas channels.

11. The simultaneously desulfurizing and denitrating process of claim 2, characterized in that the iron catalytic scrubbing with the seawater to which a certain quantity of iron ions is added is the iron catalytic scrubbing with an adding process of disposing an iron member in the acidic seawater and/or making iron material in contact with the seawater into a sacrificial anode and/or making use of a device capable of adding a ferrous solution to add iron ions.

12. The simultaneously desulfurizing and denitrating process of claim 3, characterized in that the iron catalytic scrubbing with the seawater to which a certain quantity of iron ions is added is the iron catalytic scrubbing with an adding process of disposing an iron member in the acidic seawater and/or making iron material in contact with the seawater into a sacrificial anode and/or making use of a device capable of adding a ferrous solution to add iron ions.

13. The simultaneously desulfurizing and denitrating process of claim 4, characterized in that the iron catalytic scrubbing with the seawater to which a certain quantity of iron ions is added is the iron catalytic scrubbing with an adding process of disposing an iron member in the acidic seawater and/or making iron material in contact with the seawater into a sacrificial anode and/or making use of a device capable of adding a ferrous solution to add iron ions.

14. The simultaneously desulfurizing and denitrating process of claim 2, characterized in that the magnetic catalytic scrubbing is carried out by having the seawater and/or the flue gas pass through the magnetic field with a magnetic flux density ranging from 1 to 6000 gauss.

15. The simultaneously desulfurizing and denitrating process of claim 3, characterized in that the magnetic catalytic scrubbing is carried out by having the seawater and/or the flue gas pass through the magnetic field with a magnetic flux density ranging from 1 to 6000 gauss.

16. The simultaneously desulfurizing and denitrating process of claim 4, characterized in that the magnetic catalytic scrubbing is carried out by having the seawater and/or the flue gas pass through the magnetic field with a magnetic flux density ranging from 1 to 6000 gauss.

* * * * *